(12) United States Patent
Backhaus (10) Patent No.: US 7,832,448 B2
(45) Date of Patent: Nov. 16, 2010

(54) MOLD FOR PRESSING A MULTILAYER PRESS STACK, IN PARTICULAR FOR ARRANGEMENT IN A PRESS AND/OR STACK STRUCTURE FOR PRESSING MULTILAYER COMPOSITES AND/OR A PRESS FOR PRESSING AND/OR PRODUCING MULTILAYER COMPOSITES

(75) Inventor: Dieter Backhaus, Sexau (DE)

(73) Assignee: Wickeder Westfalenstahl GmbH, Wickede (DE)

( * ) Notice: Subject to any disclaimer, the term of this patent is extended or adjusted under 35 U.S.C. 154(b) by 165 days.

(21) Appl. No.: 12/017,609

(22) Filed: Jan. 22, 2008

(65) Prior Publication Data

US 2008/0110576 A1 May 15, 2008

Related U.S. Application Data

(63) Continuation of application No. PCT/EP2006/007091, filed on Jul. 19, 2006.

(30) Foreign Application Priority Data

Jul. 20, 2005 (DE) ................ 10 2005 034 499

(51) Int. Cl.
*B32B 37/00* (2006.01)

(52) U.S. Cl. .................. 156/583.1; 156/581

(58) Field of Classification Search .......... 156/228, 156/288, 580, 581, 583.1; 100/193, 194
See application file for complete search history.

(56) References Cited

U.S. PATENT DOCUMENTS

| | | | |
|---|---|---|---|
| 3,788,211 A | 1/1974 | Mason, Jr. | |
| 4,300,280 A | 11/1981 | Majthan et al. | |
| 5,755,916 A | 5/1998 | Ceraso | |
| 5,891,291 A | 4/1999 | Okamoto et al. | |
| 6,243,946 B1 | 6/2001 | Suzuki et al. | |
| 6,645,337 B1 | 11/2003 | Backhaus | |
| 6,986,950 B2 | 1/2006 | Backhaus | |
| 2004/0151941 A1 | 8/2004 | Backhaus | |

FOREIGN PATENT DOCUMENTS

| | | |
|---|---|---|
| CN | 1077038 C | 1/2002 |
| CN | 1522197 A | 8/2004 |
| DE | 1 728 139 | 9/1971 |
| DE | 79 14 343 U1 | 9/1979 |
| DE | 93 12 308 U1 | 10/1993 |
| DE | 198 31 461 C1 | 2/2000 |
| DE | 19831461 C1 | 2/2000 |

(Continued)

*Primary Examiner*—James Sells
(74) *Attorney, Agent, or Firm*—Laurence A. Greenberg; Werner H. Stemer; Ralph E. Locher (57) ABSTRACT

A tool for pressing a multilayer press packet, particularly for placing inside a press, preferably for inserting into the insertion opening of a multiplaten press. The multilayer press packet, in particular, has a number of multilayers that are separated from one another by at least one separating plate. The tool can be electrically heated. The tool forms a cohesive unit with a heating element arranged between two heat transfer plates and/or between a heat transfer plate and a cover plate. The tools have at least one electric connecting terminal corresponding to contact terminals on the press.

39 Claims, 6 Drawing Sheets

FOREIGN PATENT DOCUMENTS

| | | |
|---|---|---|
| EP | 0 397 979 A2 | 11/1990 |
| EP | 0397979 A2 | 11/1990 |
| EP | 0785068 A2 | 7/1997 |
| FR | 822 661 | 1/1938 |
| JP | 62-256617 A | 11/1987 |
| JP | 62256617 A | 11/1987 |
| WO | 94/17975 A1 | 8/1994 |
| WO | 03/004717 A2 | 1/2003 |
| WO | 03004717 A2 | 1/2003 |

MOLD FOR PRESSING A MULTILAYER PRESS STACK, IN PARTICULAR FOR ARRANGEMENT IN A PRESS AND/OR STACK STRUCTURE FOR PRESSING MULTILAYER COMPOSITES AND/OR A PRESS FOR PRESSING AND/OR PRODUCING MULTILAYER COMPOSITES

CROSS-REFERENCE TO RELATED APPLICATIONS

This is a continuation, under 35 U.S.C. §120, of copending international application PCT/EP2006/007091, filed Jul. 19, 2006, which designated the United States; this application also claims the priority, under 35 U.S.C. §119, of German patent application No. DE 10 2005 034 499.2, filed Jul. 20, 2005; the prior applications are herewith incorporated by reference in their entirety.

BACKGROUND OF THE INVENTION

Field of the Invention

The present invention relates to a tool for pressing a multilayer press stack, in particular for configuration in a press, preferably for insertion into the insertion opening of a stage press, such that in particular the multilayer press stack has a plurality of multilayer composites arranged so they are separated from one another by at least one dividing plate. In addition, the invention also relates to a stack structure for pressing multilayer composites using the tool as defined above. Finally, the invention relates to a press for pressing, i.e., producing multilayer composites using the tool as defined above and/or using the stack structure as defined above.

Tools and stack structures of various designs, in particular multilayer press stacks, are known in the prior art for the production of multilayer composites, preferably for pressing multilayer circuit boards. Pressing of the multilayer composites (circuit boards) is generally performed in stage presses in vacuo, such that the individual layers of the multiplayer composite are pressed together accordingly at a temperature of approx. 180° C.

In general, a stack structure (press stack structure) is first implemented for the configuration in a press. In doing so, several multilayer composites are arranged one above the other between two press plates, which are referred as press tools, and between press cushions, these multilayer composites being separated from one another by appropriate dividing plates. Each individual multilayer composite (multilayer circuit) is (usually) designed in multiple layers, namely having multiple inner layers and prepreg layers, a copper film being laminated onto each side. This stack structure is then inserted into a press.

In the production of the multilayer composite itself, there are various problematical areas. First, because of the thermal expansion of the dividing plates, there may also be an unfavorable shifting/movement of the individual layers of the multiplayer composite, i.e., the prepreg layers and/or the laminate layers and/or also the copper films arranged between them. On the other hand, it is also important that with the help of the dividing plates, the pressure within the multilayer press stack must also be transmitted uniformly to the individual prepreg layers and/or laminate layers of the multilayer press stack, so that optimal bonding of a multilayer composite can be achieved and slippage of the individual layers is prevented as much as possible.

The known tools, stack structures and multilayer press stacks are not yet optimal for the next generation of circuit boards (multilayer composites), in particular for FineLine technology. The printed conductors are becoming progressively thinner while at the same time more and more must be accommodated on a smaller surface area, in particular with the help of HDI, i.e., high-density interconnect technology. On the one hand, the copper film to be used here is becoming progressively thinner, with a thickness of less than 12 µm or even 5 µm being mentioned, but in addition there is also the risk that in pressing multilayer composites, the printed conductors of the inner layers may press through the outer copper films. We speak of so-called "image transfer" for the resulting effect. One problem here is irregular removal of thickness in etching and corresponding inaccuracies in drilling. In particular these extremely thin outer copper films can no longer be installed manually. In other words, they must preferably be produced as a composite, e.g., with a dividing plate or press plate, as described in German patent DE 198 31 461 C1, or special dividing plates which have a certain tensile strength and/or a certain strain limit at a certain temperature and also an additional coating must be used.

In pressing multilayer composites in the usual stage presses, with the devices known in the prior art, heat is generated in the permanently installed pressure plates of the respective press. The leading technology here worldwide is currently pressing of multilayer composites (multilayer circuits) in stage presses. Approximately 95% of world demand is produced by pressing in this way. In one or more aligned openings of a stage press, "multiple presses objects" are arranged together in a so-called "tool" or "tool" to form a stack (book) per stage, i.e., per insertion opening. The individual pressed objects are separated from one another by dividing plates to prevent the internal structure from collapsing, so that the individual panels can be unstacked with no problem after cooling. Each stage of the press here has an upper and a lower press plate, which is heated by externally heated thermal oil. In other words, corresponding heating channels are provided inside the upper and lower pressure plates of the press with the externally heated thermal oil passing through the heating channels to heat the upper and lower pressure plates. The entire press face is in a chamber in which a vacuum is created after closing the individual stages of the stage press. The thermal oil circulating through the channels, i.e., bores in the upper and lower pressure plates, has essentially a temperature of approx. 190° C. All the stages of the stage press therefore have the same heat source, i.e., only multilayer composites having the same parameters, i.e., in particular at the same temperatures, can be pressed per press operation in all stages of the stage press.

In the presses known in the prior art, the layer structure is essentially as follows: below the upper press plate and/or above the lower press plate, each having a thickness of approx. 40 mm, there is a cushion of approx. 1.7 mm press cushion cardboard. These are followed by the tools, i.e., an approx. 10 mm thick stainless steel plate (press plate) between which the dividing plates, preferably made of stainless steel with a thickness of approx. 1.5 mm (11 pieces) and the corresponding multilayer composite are arranged. As a result, a total of approx. 119.9 mm "dead material" must be heated, i.e., the heat must penetrate through it to ultimately supply the temperature of approx. 150° C. that is required for conversion of the resin to the press objects located at the center of the book. Because of the poor thermal conductivity factors of the materials described above, this is very energy intensive on the one hand while on the other hand being very time consuming, so that production of the corresponding multilayer composites, i.e., circuit boards, is thus also very cost intensive. This is due in particular to the irregular and unfavorable heat distribution in the vertical direction as well as in the horizontal direction within the multilayer press stack.

BRIEF SUMMARY OF THE INVENTION

It is accordingly an object of the invention to provide a tool and/or a stack structure and/or a press, which overcomes the above-mentioned disadvantages of the heretofore-known devices and methods of this general type and which is improved in such a way that thorough heating of the multilayer press stack is improved and the associated costs are reduced while productivity and the quality of the products are increased.

With the foregoing and other objects in view there is provided, in accordance with the invention, a press stack structure for a press for pressing multilayer composites for insertion into an insertion opening of the press, comprising:

three electrically heatable tools and first and second multilayer press stacks;

the tools forming heating units each having at least one electrically operable, flat heating element, the tools including:

a first tool disposed substantially centrally within the press stack structure, the first tool being formed with two heat transfer plates and the heating element arranged between the two heat transfer plates;

a second tool disposed on top of the first multilayer press stack and a third tool disposed below the second multilayer press stack, the second and third tools forming terminal elements of the press stack structure;

each of the second and third tools having a cover plate, a heat transfer plate, and the heating element disposed therebetween, the cover plates being steel plates and the heat transfer plates being composite material plates;

the first tool forming a cohesive unit with the heating element arranged between the two heat transfer plates, and the second and third tools each forming a cohesive unit with the heating element arranged between the cover plate and the heat transfer plate; and the tools each having at least one electric connecting terminal configured to correspond to contact terminals on the press.

The object defined above has now been achieved—for the tool—by the fact that the tool is designed to be electrically heatable, namely at least one electrically heatable heating element is provided.

The object defined above has now been achieved—for the stack structure—by the fact that at least one tool is provided that is designed to be electrically heatable namely it has an electrically operable heating element.

In addition, the object defined above is now achieved—for the press—by the fact that at least one tool that is designed to be electrically heatable is provided and/or a stack structure having such a tool is provided and can be arranged in the press and at least one electric contact terminal is provided for the respective heating element of the respective tool.

Due to the fact that the tool is initially designed to be electrically heatable, in particular an electrically operable heating element being provided, the heating element being designed as a flat heating body in particular, this yields some important advantages. First—in contrast with the prior art—the upper and lower pressure plates of the press are now being heated. Heating by externally heated thermal oil is therefore omitted. A better heat distribution over the area is thus possible in particular with a heating element designed as a flat heating body. This yields a uniform and rapid heat distribution in the vertical and horizontal directions inside the multilayer press stack. In particular, presses that already exist in the prior art, in particular stage presses, can now advantageously be utilized with a tool, i.e., stack structure designed according to the present invention. With the presses that already exist, only minor retrofitting work would be necessary, as emphasized even more clearly by the following discussion. On the basis of the inventive configuration, i.e., layer structure of the inventive stack structure, in particular with the basic idea of the configuration of a tool that is directly operable electrically, namely heatable electrically, not only can a good heat distribution be achieved in the vertical and horizontal directions within the multilayer press stack, which increases the quality of the multilayer composite to be produced, but also the production time and thus the labor costs and energy costs are reduced significantly. Productivity in particular is increased significantly because due to an inventive combination of the layer structure of the stack structure, which will be explained in greater detail below, it is no longer necessary to heat so much "dead material" as in the past and the "space gained" can be utilized to arrange additional multilayer composites and/or dividing plates and therefore to increase productivity. As a result, the disadvantages that existed in the prior art can therefore be avoided and significant advantages can be achieved.

There are now a number of possibilities for designing and improving upon the inventive tool, the inventive stack structure and/or a corresponding press in an advantageous manner. Additional and advantageous features which are considered as characteristic for the invention are set forth in the appended claims.

Although the invention is illustrated and described herein as embodied in tool for pressing a multilayer press stack, in particular for configuration in a press and/or stack structure for pressing multilayer composites and/or a press for pressing and/or producing multilayer composites, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1A:
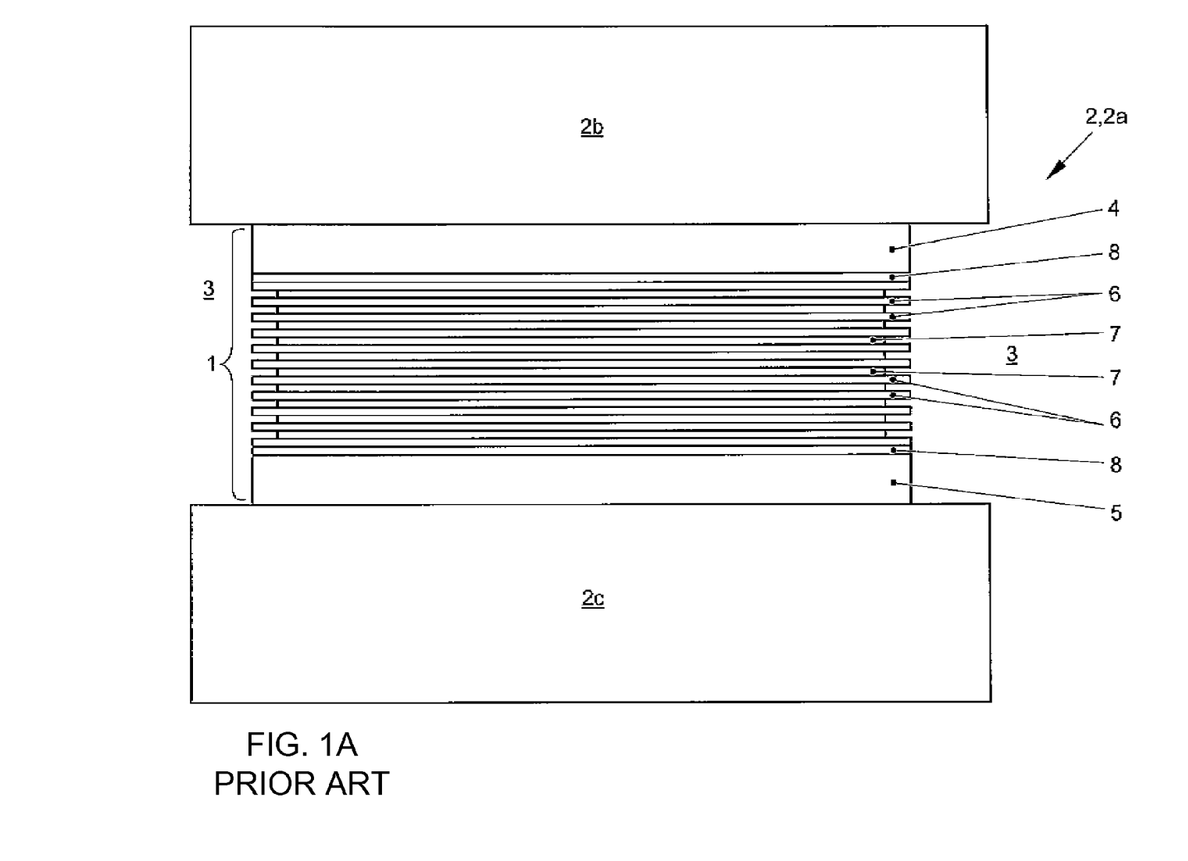
FIGS. 1A and 1B are schematic diagrams illustrating the design of a press stack and/or its configuration in a press as known in the prior art.
Figure 1B:
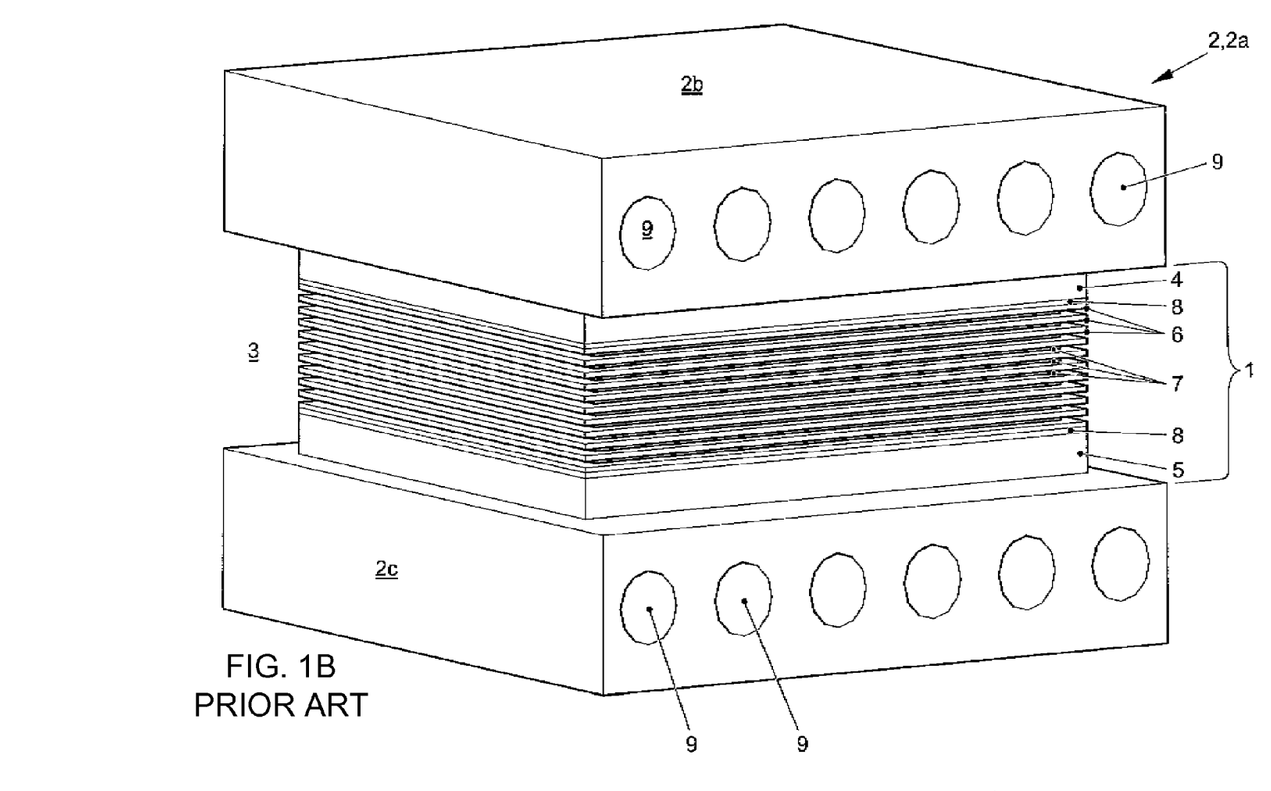

Referring now to the figures of the drawing in detail and first, particularly, to FIGS. 1A and 1B thereof, there is illustrated a press stack as it is known so far in the prior art, at least partially from the side and/or at least partially in a perspective view, i.e., the stack structure 1 in a press 2 that is shown only partially, here for insertion into the insertion opening 3 of a stage press 2a which is shown here only partially.

It can be seen here that the stack structure 1 known in the prior art has two tools 4 and 5 namely an upper tool 4 and a lower tool 5. Multilayer composites 7 separated from one another by corresponding dividing plates 6 are arranged between the tools 4 and 5.

The thickness of the upper and lower pressure plates 2b and 2c with the presses 2 which are usually used in the prior art is approx. 40 mm in each case. The tools 4 and 5 which are preferably made of stainless steel plates have an approximate thickness of approx. 10 mm. Between the tools 4 and 5 and the respective adjacent dividing plate 6, there is disposed a press cushion layer 8 with a thickness of 1.7 mm. Between the press cushion layers 8, there are then 11 dividing plates 6 and intermediate multilayer composites 7 for a total of 10 multilayer composites 7. The layer thickness of the dividing plates 6 amounts to substantially 1.5 mm and the thickness of the multilayer composites is 1.4 mm. This configuration can be seen well in FIGS. 1A and 1B.

FIG. 1B shows the channels 9 which are designed in the pressure plates 2b and 2c. Externally heated thermal oil runs through the channels 9 so that the pressure plates 2b and 2c are heated accordingly and—in the end effects—the stack structure 1 is heated accordingly. In other words the pressure plates 2b and 2c are heated accordingly and deliver their heat via the tools 4 and 5 and via the press cushion layer 8 to the dividing plates 6 and/or the multilayer composites 7, so that a corresponding pressing of the multilayer composite can be accomplished here at the respective temperatures and at the respective pressure. To this extent this much is known essentially in the prior art. The thickness of the "dead material" to be penetrated in FIGS. 1a and/or 1b therefore amounts to essentially 119.9 mm. At the middle of the stack structure 1 the required heat for conversion of the resin amounting to approx. at least 150° C. is reached only after a certain long period of time. The heat distribution in horizontal and vertical directions is therefore not optimum in the prior art and in particular it also depends on the specific design of the channels 9.

The disadvantages described in the introduction and existing in the prior art are now avoided first by the fact that the tool is designed to be electrically heatable, namely at least one electrically operable heating element 10 is provided. In other words the respective tool can now be heated electrically directly and heating by the pressure plates 2b and/or 2c of the press 2 is no longer necessary—as was customary in the prior art. The specific design of the tools and/or the inventive stack structure 1a (of the press stack) is explained in greater detail below on the basis of FIGS. 2A through 2C and/or FIG. 3.

Figure 2A:
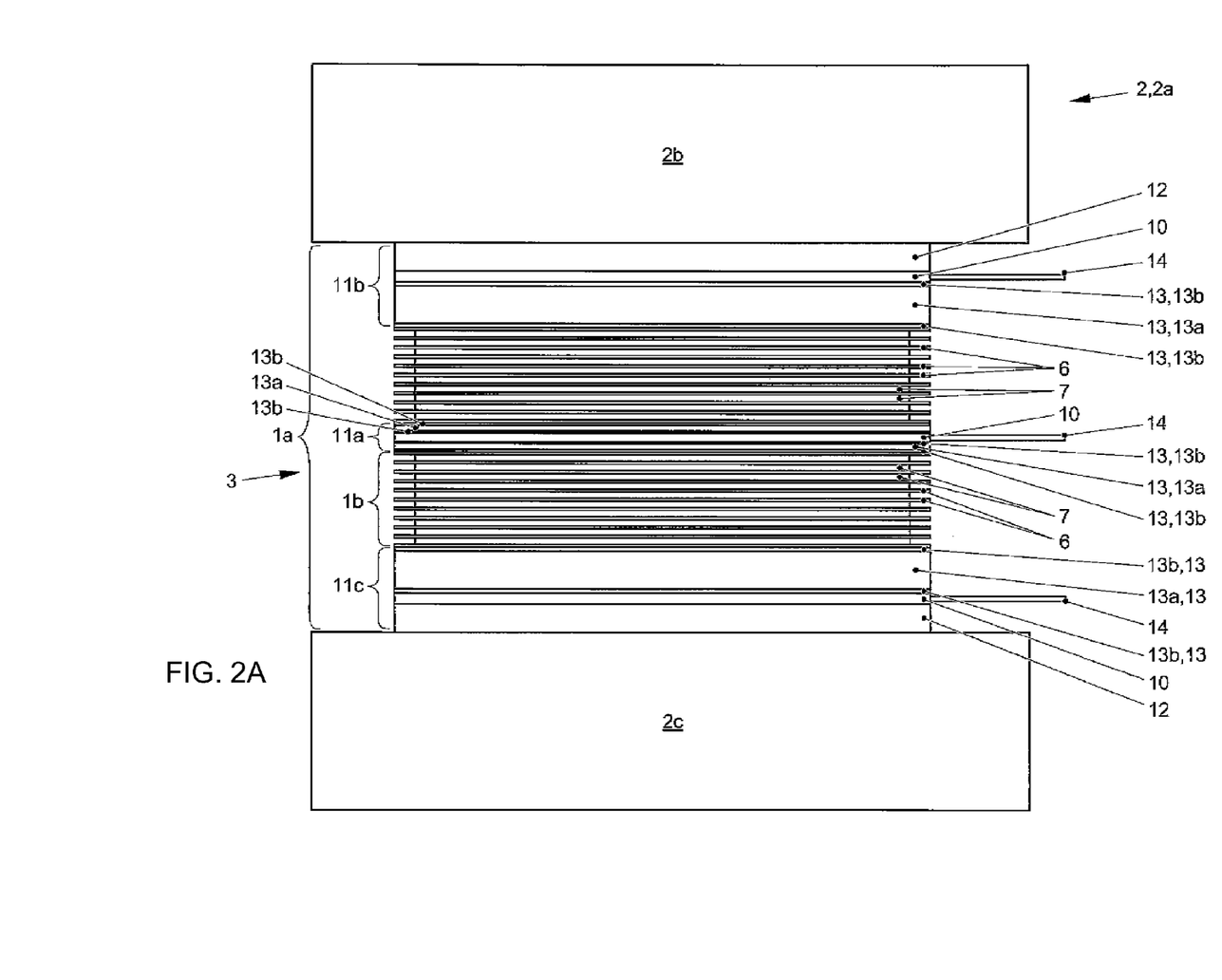
FIG. 2A is a schematic, diagrammatic side view of the configuration of an inventive tool and/or stack structure in a press.
Figure 2B:
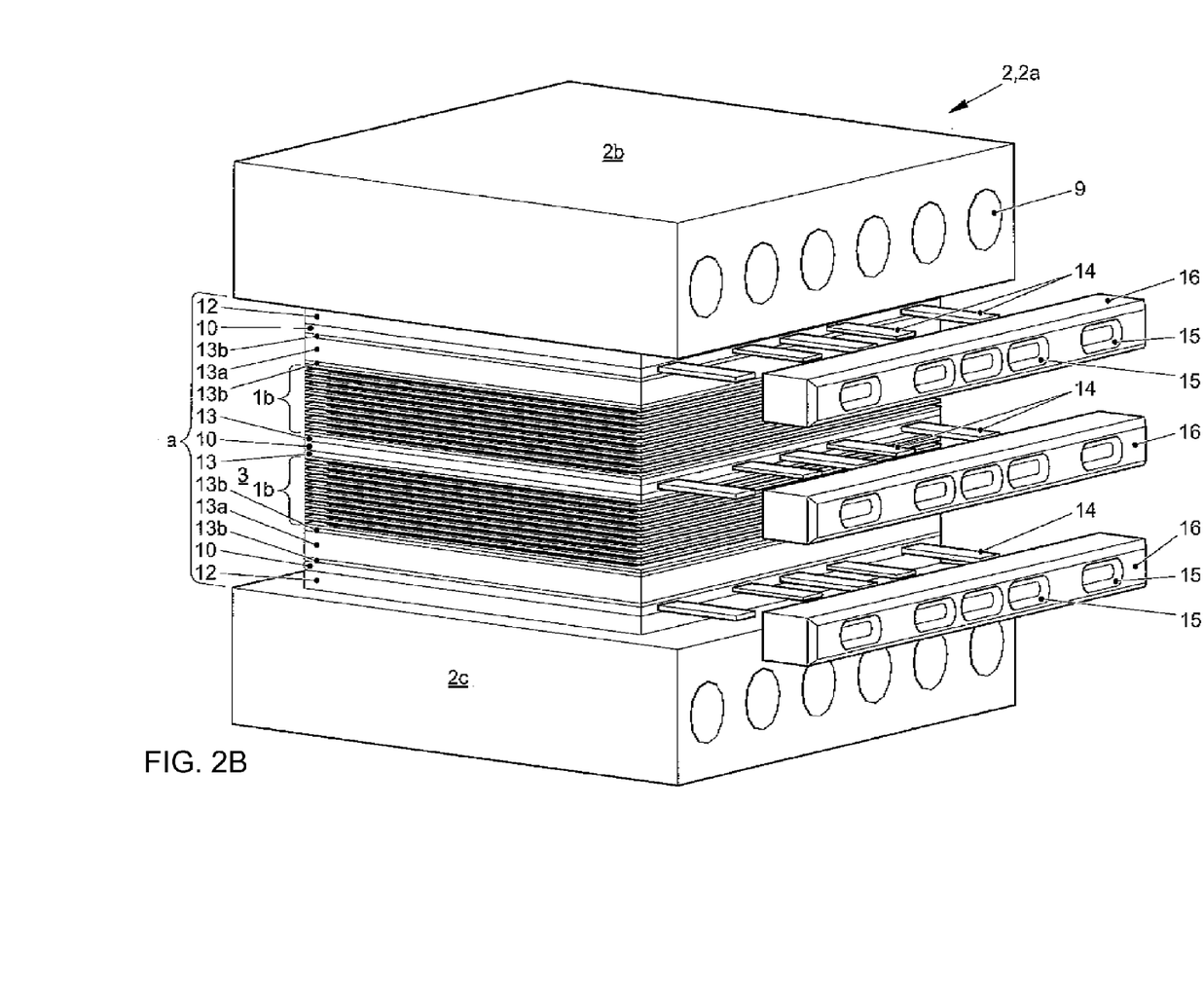
FIG. 2B is a perspective view of a schematic diagram of the configuration of an inventive tool and/or stack structure in a press.
Figure 2C:
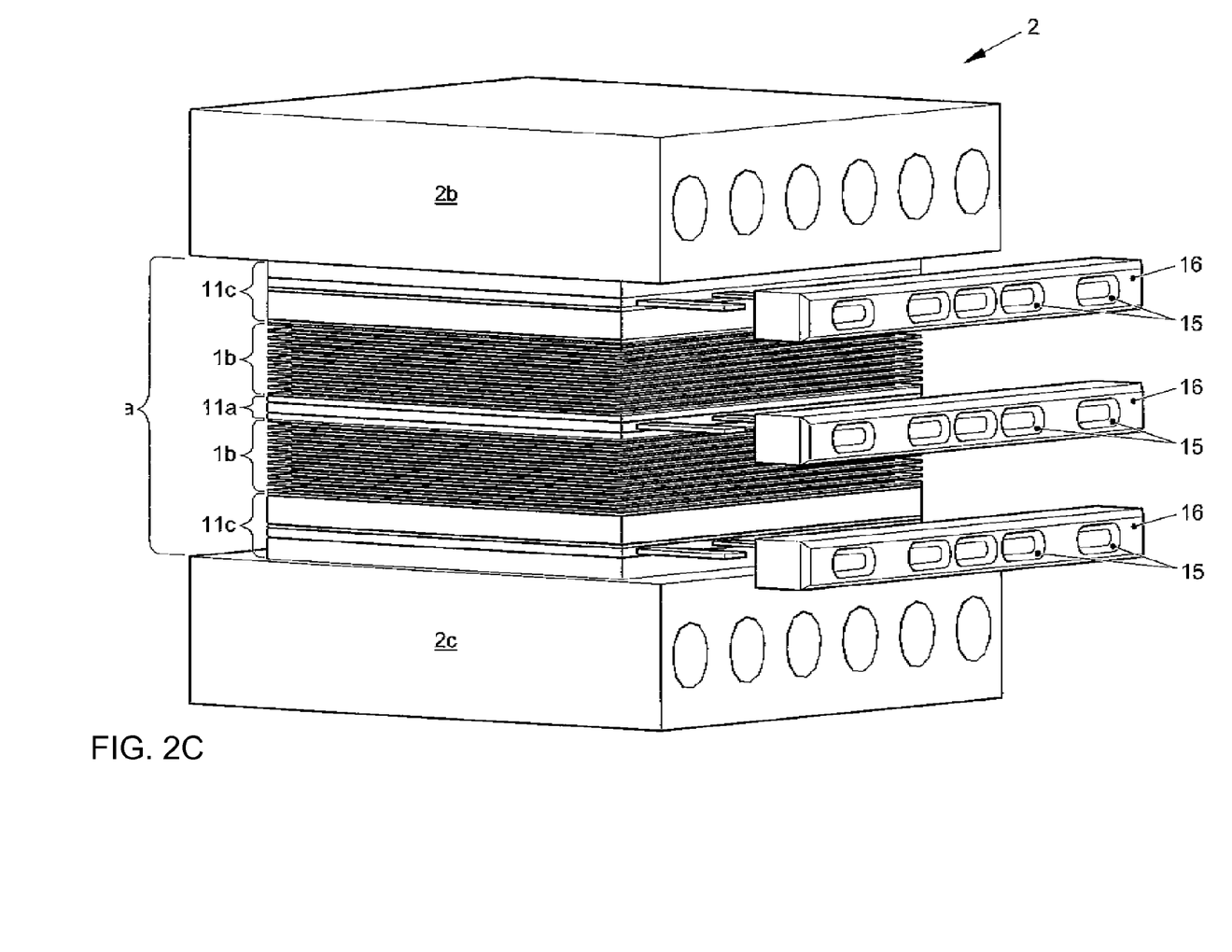
FIG. 2C is a similar view of the configuration.

FIGS. 2A through 2C now show preferably the inventive stack structure 1a with the respective tools 11a, 11b and 11c, also referred to as "molds," designed according to the present invention. The inventive stack structure 1a (press stack structure) here thus has preferably several tools 11a, 11b and 11c as well as two multilayer press stacks 1b arranged between them. First, the inventive tools 11a through 11c will be explained in greater detail.

The tools 11a through 11c are also shown and/or arranged here within the stack structure 1a and are readily discernible. First, each tool 11a through 11c has at least one electrically operable heating element 10. The heating element 10 is preferably arranged between a cover plate 12 and a heat transfer plate 13. This is implemented in the case of tools 11b and 11c, for example. In the case of tool 11a, the heating element 10 is arranged between two heat transfer plates 13. The differences will be explained below.

However, the deciding factor is that the respective tools 11a through 11c are designed essentially as a cohesive structure due to the heating element 10 arranged between the cover plate 12 and the heat transfer plate 13 and/or between the two heat transfer plates 13. The individual plates and/or the heating element are joined together by corresponding screws and/or screw connections, which are partially countersunk in the plate-like elements. The tools 11a, 11b and/or 11c thus each form a "heating unit."

The heating elements 10 are preferably designed as flat heating bodies. The cover plate of the respective tool 11b and 11c is preferably designed as a stainless steel plate. However, it is also conceivable for it to be designed as a simple steel plate.

The heating elements 10 are preferably designed as flat heat-wave radiators, or wave heaters, i.e., Mekanit heating elements, with each heating element 10 having at least one electric plug connection terminal 14 for connection to corresponding contacts 15 of the press 2.

The heat transfer plates of the tools 11a through 11c are preferably designed as composite material plates. In this case these composite material plates have an aluminum core 13a in the interior and have two outer plated stainless steel layers 13b. Thus the heating of the dividing plates and the multilayer composites 7 is implemented via the direct electric heating of the respective tool 11a through 11c, i.e., in the final effect in particular via the heat transfer plates 13. The heat transfer plates 13 preferably have a surface hardness, i.e., in particular the stainless steel layers 13b of HRC 30 through 50. The surface of the heat transfer plates 13, i.e., preferably the surfaces of the stainless steel layers 13b preferably have a roughness of up to 70 μm. The thermal conductivity of the heat transfer plates 13 amounts to essentially 200 W/(m·K). A power of up to 3.5 W/cm$^2$ and a maximum temperature of up to 350° C. are thus ensured by the heating elements 10. The heat transfer plates 13 of the tools 11b and 11c illustrated in FIGS. 2a through 3 have essentially a thickness between 4 and 20 mm, preferably between 6 and 15 mm, especially 10 mm. The aluminum core 13a here is preferably 8 mm thick on the whole and the plated stainless steel layers 13b are preferably 1 mm thick.

The heat transfer plates 13 of the first tool 11a are likewise designed as composite material plates and each has a total thickness between 1.5 and 15 mm, preferably between 3 and 10 mm, especially preferably 2.3 mm. The aluminum core 13a preferably has a thickness of 1.5 mm and the respective plated stainless steel layer 13b is made of 0.4 mm stainless steel. It is also conceivable for the heat transfer plates 13 for tools 11a through 11c not to be made of stainless steel but instead to be made of plain steel. This will depend upon the particular application.

The cover plates 12 of the second and third tools 11b and 11c each have a thickness in the range between 3 and 10 mm, preferably between 5 and 8 mm, especially 6 mm. The ratio of aluminum to steel/stainless steel in the heat transfer plates 13 is essentially in the range between 50% to 50%, preferably in the range of 60% to 40%, especially 80% to 20%, each given in % by weight. The amount of aluminum is thus in the range of >50 up to max. 80% by weight, relative to the remaining steel/stainless steel component. It is also conceivable for the heat transfer plates 13 of the tools 11a through 11c to be made of solid steel/stainless steel, but the preferred alternative described above has a better coefficient of thermal conduction.

Figure 3:
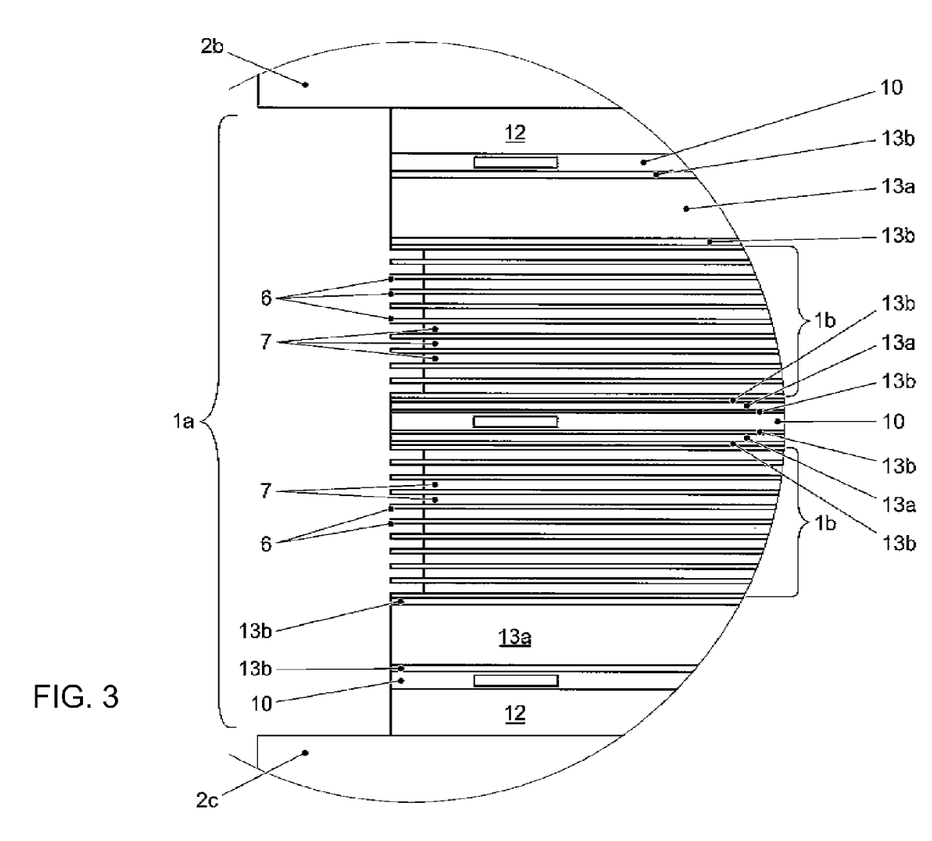
FIG. 3 is a partially enlarged, individual side view illustrating the novel stack structure according to the invention.

The stack structure 1a shown in FIGS. 2a through 2c and in FIG. 3 is thus also characteristic of the three tools 11a through 11c that are preferably used here and the multilayer press stacks 1b arranged between them, i.e., the corresponding dividing plates 6 and the multilayer composite 7.

However, it is not absolutely necessary for the press stack 1a to have three tools 11a through 11c. The important thing is that at least one tool designed according to the present invention, preferably the first tool 11a, is arranged essentially centrally inside the stack structure 1a. This would already be sufficient for implementation of the pressing operation because an optimal heat distribution is then ensured within the stack structure 1a. Then only the individual cover plates 12 are preferably used for thermal insulation as sealing elements of the stack structure 1a, i.e., no tools 11b and 11c are used.

Preferably, however, a second tool 11b is additionally arranged at the top of multilayer press stack 1b and a third tool 11c is arranged beneath another multilayer press stack 1b, each being provided as the sealing element of the stack structure 1a. This achieves an even better heat distribution within the stack structure 1a.

As FIGS. 2 through 3 show, the stack structure 1a is essentially as follows from top to bottom by layers: first the second tool 11b sits on the top, then followed by several multilayer composites 7 separated by dividing plates, i.e., forming a multilayer press stack 1b and then the tool 11a which is preferably arranged centrally is followed by several multilayer composite 7 separated by dividing plates 6, i.e., forming a second multilayer press stack 1b, and then in conclusion the third tool 11c as the bottom sealing element.

The dividing plates 6 used here have a thickness of 0.2 to 1.5 mm, preferably in the range of 0.3 to 1.0 mm, especially 0.5 mm. The dividing plates 6 have a tensile strength of at least $Rn \geq 500$ MPa and/or a strain limit $Rp_{0.2} \geq 470$ MPa at a temperature of much more than 180° C. In addition, the dividing plates may also be provided with an organic, inorganic or metallic coating. An organic coating is preferably applied as a lubricant, namely the lubricant produced on an olefin base. It is also conceivable for a lubricant to be produced as a polymer on a polyolefin base.

For the use of dividing plates 6 there are essentially three alternatives, preferably as the first alternative, dividing plates 6 are used as steel plates but not as stainless steel plates, having substantially the following amounts: 0.03 to 1.2% by weight C, preferably 0.03 to 0.1% by weight C, 0.2 to 1.5% by weight Mn, preferably 0.2 to 0.5% by weight Mn and minor traces of phosphorus, sulfur, aluminum and/or silicon. The coefficient of thermal conduction here is substantially 60 W/(m·K).

As the second alternative for the dividing plates 6, aluminum alloy plates may also be used if they contain the following percentage amounts: at least 0.25% by weight Si, at least 0.4% by weight Fe, at least 0.05% by weight Mn, between 0.05 and 5% by weight Mg, between 0.1 and 8% by weight Zn, between 0.1 and 2% by weight Cu and the remaining % by weight Al. Such aluminum alloy plates preferably have a tensile strength Rm of 300 to 680 MPa, preferably 680 MPa. The yield point, i.e., the strain limit $Rp_{0.2}$ corresponds in amount to essentially 60% to 80%, preferably 70% of the respective tensile strength Rm. The coefficient of thermal conduction here is substantially 210 W/(m·K).

As the third alternative for the dividing plates 2, hard anoxidized aluminum plates may also be used if they have a thickness of at least 1 μm. The coefficient of thermal conduction is substantially at 210 W/(m·K).

Therefore, as the fourth alternative, dividing plates 6 that are designed as composite sheeting having an aluminum core as described above and two outer plated steel or stainless steel layers are also conceivable, i.e., like the heat transfer plates 13 as described above. The coefficient of thermal conduction here is substantially 200 W/(m·K).

It is especially advantageous that the presses 2 which already exist in the prior art can easily be retrofitted. Such presses 2 are then provided with the inventive stack structure 1a and/or with the inventive tools 11a through 11b, as shown in FIG. 2 through 3, such that at least one electric contact terminal 15 is provided for each respective heating element 10. Since one heating element 10 preferably has several electric connecting terminals 14, the corresponding contact terminals 15 are preferably implemented within a contact strip 16, such that the contact strip 16 is arranged on the rear wall of the respective insertion opening 3 of the respective press 2.

It is also conceivable for the heating elements 10 not to be designed as flat heating element but instead as heating coils, which are arranged in or on the respective tool 11a through 11c. This may also depend on the respective application. Here again the corresponding electric plug connections and/or contacts would have to be provided on the respective press.

In the stack structure 1a shown here the cover plates 12 of the second and third tools 11b and 11c are preferably designed as stainless steel plates such that they preferably also have a thickness of 4 mm and an insulation layer (not shown here) is provided between the cover plate 12 and the respective heating element 10. The cover plate 12 and insulation layer prevent the heat from escaping to the outside. In combination with a heat transfer plate 13 designed as a composite material plate, the thermal conductivity of the heating elements 10 is especially advantageous. In this way a homogeneous heat distribution can be achieved within the stack structure 1a, in particular within the multilayer press stacks 1b. But the heating elements 10 used here, in particular the flat heating elements which are preferably designed as flat Mekanit heating elements, optimal heating of the heat transfer plates 13 and heating of the dividing plates 6 and the multilayer composite 7 is thus implemented.

It can be seen well from FIGS. 2A through 2C that the heating elements 10 have electric plug connection terminals 14. To this end, the press 2 has corresponding contacts 15. These electric plug connection terminals 14 and/or contacts 15 may be designed as contact plugs and/or sockets, i.e., as a type of male/female connection. The presses 2 that already exist in the prior art may then be retrofitted without any great expense. The corresponding connections are preferably arranged within various strips 16 as shown here and arranged on the rear wall within a press 2.

The heat transfer plates 13, in particular the stainless steel layers 13b have a surface hardness of HRC 30 to 50, such that they have a maximum roughness of up to 70 μm at the surface. The thermal conductivity of the heat transfer plates 13 is preferably essentially 200 W/(m·K).

The heating elements 10 preferably have a power of up to 3.5 W/cm² and may be heated up to a maximum temperature of up to 350° C. The design of the heating elements 10 is not shown here in detail. The heating elements 10 which are designed as flat heating elements (so-called flat Mekanit heating elements) have a heating conductor, a cover insulation made of a special fine mica and thermal Mekanit.

An ideal distribution of the heating output is achieved in the application with different heat output zones but also over the entire area. Productivity is thus increased with the inventive stack structure 1a, in particular a better heat distribution being achieved in the multilayer press stacks 1b. The working operation as such is no longer so time consuming, which in turn results in an increase in productivity. Furthermore, due to the electric heatability of the multiple layer press stacks 1b in the different stages of a stage press, it is now possible to produce multilayer composites under various parameters. In other words, the individual stages accordingly are controlled differently electrically, i.e., preferably being heated at different temperatures. The control system is also simple accordingly. A control panel system can be installed. Existing presses need only be retrofitted at a low cost and in particular the electric terminals for the heating elements 10 must be arranged. With the thickness ratios and thickness areas indicated above, in particular with the thicknesses of the individual plates as preferred and as ideally given, the stage presses 2a that currently exist in the prior art can be assembled with a much greater number of dividing plates 6 and/or multilayer composites 7, so that a greater productivity can be achieved, namely on the whole up to 40 multilayer composites 7 can be arranged and/or pressed, i.e., with a four-fold amount of the volume known in the prior art. In detail:

In the inventive stack structure 1a the use of press cushions is eliminated due to the direct electric heating with the help of the heating elements 10 with which a good heat distribution is also implemented within the multilayer press stacks 1b. Due to the special insulation of the stack structure 1a via the sealing elements namely via the cover plates 12 of the tools 11b and/or 11c, a good heat distribution is achieved within the multilayer press stacks 1b because the heat is emitted primarily only into the interior of the multilayer press stacks 1b, i.e., to the multilayer composite 7 that is to be pressed. Thus with the presses 2 that already exist in the prior art, the existing pressure plates 2b, 2c need no longer be heated. The use of press cushions is eliminated. When using three tools 11a through 11c as shown in FIGS. 2a through 2c and/or 3, each heat source, i.e., each heating element 10 is responsible only for heating a few layers. This shortens the time until reaching the temperature of resin conversion at the middle of the "book" to approx. 25% with at the same time a considerable improvement in the surface quality that is achieved due to the better and more uniform flow of resin. In this way the press cycle can be shortened from the approx. 100 minutes known in the prior art to now approx. 30 minutes. If so far 10 multilayer composites can be pressed per stage in 100 minutes, a total of 80 items can be pressed with the use of dividing plates 6 with 1.5 mm stainless steel plates and conventional technology on an eight-stage press in the prior art, then the number of panels per book is increased to 20 while cutting the press time in half by using the inventive stack structure 1a. This can be calculated as a four times higher heat output while achieving an improvement in quality at the same time.

Therefore as a result the disadvantages described in the introduction are avoided and significant advantages are achieved.

The invention claimed is:

1. A press stack structure for a press for pressing multilayer composites for insertion into an insertion opening of the press, comprising:
   three electrically heatable tools and first and second multilayer press stacks;
   said tools forming heating units each having at least one electrically operable, flat heating element, said tools including:
      a first tool disposed substantially centrally within the press stack structure, said first tool being formed with two heat transfer plates and said heating element arranged between said two heat transfer plates;
      a second tool disposed on top of said first multilayer press stack and a third tool disposed below said second multilayer press stack, said second and third tools forming terminal elements of the press stack structure;
      each of said second and third tools having a cover plate, a heat transfer plate, and said heating element disposed therebetween, said cover plates being steel plates and said heat transfer plates being composite material plates;
   said first tool forming a cohesive unit with said heating element arranged between said two heat transfer plates, and said second and third tools each forming a cohesive unit with said heating element arranged between said cover plate and said heat transfer plate; and
   said tools each having at least one electric connecting terminal configured to correspond to contact terminals on the press.

2. The press stack structure according to claim 1, wherein said cover plate of said second and third tools is a stainless steel plate.

3. The press stack structure according to claim 1, wherein said heating element is a flat heating element.

4. The press stack structure according to claim 1, wherein said composite material plate is formed with an aluminum core in an interior and two outer plated stainless steel layers.

5. The press stack structure according to claim 1, wherein said heat transfer plate has a surface hardness of HRC 30 to 50.

6. The press stack structure according to claim 1, wherein a surface of said heat transfer plate has a maximum roughness of up to 70 μm.

7. The press stack structure according to claim 1, wherein said heat transfer plate has a thermal conductivity of substantially 200 W/(mK).

8. The press stack structure according to claim 1, wherein said heating element is designed for a power of up to 3.5 W/cm$^2$ and a maximum temperature of up to 350° C.

9. The press stack structure according to claim 1, wherein said heat transfer plate has a thickness of 4 to 20 mm.

10. The press stack structure according to claim 9, wherein said heat transfer plate has a thickness of 6 to 15 mm.

11. The press stack structure according to claim 10, wherein said heat transfer plate has a thickness of substantially 10 mm.

12. The press stack structure according to claim 1, wherein said heat transfer plate has a thickness of 1.5 to 15 mm.

13. The press stack structure according to claim 12, wherein said heat transfer plate has a thickness of 3 to 10 mm.

14. The press stack structure according to claim 12, wherein said heat transfer plate has a thickness of substantially 2.3 mm.

15. The press stack structure according to claim 1, wherein said cover plate has a thickness of 3 to 10 mm.

16. The press stack structure according to claim 15, wherein said cover plate has a thickness of 5 to 8 mm.

17. The press stack structure according to claim 16, wherein said cover plate has a thickness of substantially 6 mm.

18. The press stack structure according to claim 1, wherein said heat transfer plate is formed of a material having a ratio of aluminum to steel/stainless steel of approximately 50% to 50%.

19. The press stack structure according to claim 1, wherein said heat transfer plate is formed of a material having a ratio of aluminum to steel/stainless steel of approximately 60% to 40%.

20. The press stack structure according to claim 1, wherein said heat transfer plate is formed of a material having a ratio of aluminum to steel/stainless steel of approximately 80% to 20%.

21. The press stack structure according to claim 1, sequentially structured, from top to bottom, with the following layers: said second tool, a plurality of multilayer composites separated by dividing plates, said first tool, a plurality of multilayer composites separated by dividing plates, and said third tool.

22. The press stack structure according to claim 21, wherein said dividing plates have a thickness of 0.2 to 1.5 mm.

23. The press stack structure according to claim 21, wherein said dividing plates have a thickness of 0.3 to 1.0 mm.

24. The press stack structure according to claim 21, wherein said dividing plates have a thickness of substantially 0.5 mm.

25. The press stack structure according to claim 21, wherein said dividing plates have a tensile strength of at least Rm ≧500 MPa and/or a strain limit of at least $Rp_{0.2}$ ≧470 MPa at a temperature of approximately 180° C.

26. The press stack structure according to claim 21, wherein said dividing plates have a coating selected from the group consisting of an organic coating, an inorganic coating, and a metallic coating.

27. The press stack structure according to claim 26, wherein said coating is an organic coating applied as a lubricant.

28. The press stack structure according to claim 27, wherein said lubricant is produced on an olefin basis.

29. The press stack structure according to claim 27, wherein said lubricant is a polymer based on polyolefin.

30. The press stack structure according to claim 21, wherein said dividing plates are steel plates, but not stainless steel plates, having: 0.03 to 1.2% by weight C; 0.2 to 1.5% by weight Mn; and traces of one or more of phosphorus, sulfur, aluminum and silicon.

31. The press stack structure according to claim 21, wherein said steel plates contain: 0.03 to 0.1% by weight C and 0.2 to 0.5% by weight Mn.

32. The press stack structure according to claim 21, wherein said dividing plates are aluminum alloy plates containing: at last 0.25% by weight Si; at least 0.4% by weight Fe; at last 0.05% by weight Mn; from 0.05 to 5% by weight Mg; from 0.1 to 8% by weight Zn; from 0.1 to 2% by weight Cu; and a remainder Al.

33. The press stack structure according to claim 32, wherein said aluminum alloy plates have a tensile strength of 300 to 680 MPa and a strain limit $Rp_{0.22}$ of substantially 70% of the tensile strength.

34. The press stack structure according to claim 32, wherein said aluminum alloy plates have a tensile strength of substantially 680 MPa.

35. The press stack structure according to claim 21, wherein said dividing plates are hard anoxidized aluminum plates with hard anoxidizing of at least 1 μm thickness on both sides thereof.

36. The press stack structure according to claim 21, wherein said dividing plates are composite material plates having an aluminum core and two outer-plated steel/stainless steel layers.

37. A press for pressing a multilayer press stack configured to receive therein at least one press stack structure according to claim 1.

38. An assembly for producing multilayer composites, comprising:
a press stack structure formed with three electrically heatable tools and first and second multilayer press stacks;
said tools forming heating units each having at least one electrically operable, flat heating element, said tools including:
a first tool disposed substantially centrally within the press stack structure, said first tool being formed with two heat transfer plates and said heating element arranged between said two heat transfer plates;
a second tool disposed on top of said first multilayer press stack and a third tool disposed below said second multilayer press stack, said second and third tools forming terminal elements of the press stack structure;
each of said second and third tools having a cover plate, a heat transfer plate, and said heating element disposed therebetween, said cover plates being steel plates and said heat transfer plates being composite material plates;
said first tool forming a cohesive unit with said heating element arranged between said two heat transfer plates, and said second and third tools each forming a cohesive unit with said heating element arranged between said cover plate and said heat transfer plate;
a press for pressing multilayer composites, said press having an insertion opening for receiving said press stack structure, and a contact terminal disposed on a rear wall of said insertion opening; and
said tools each having at least one electric connecting terminal corresponding to said contact terminal at the rear wall of said insertion opening of said press, whereby electrical contact is made between said tools and said press when said press stack structure is inserted into aid press.

39. The assembly according to claim 38, wherein said contact terminal of said press is configured within a contact strip.

* * * * *